D. G. LITTLEFIELD.
Base Burning Stove.
No. 1,815. Reissued Nov. 8, 1864.
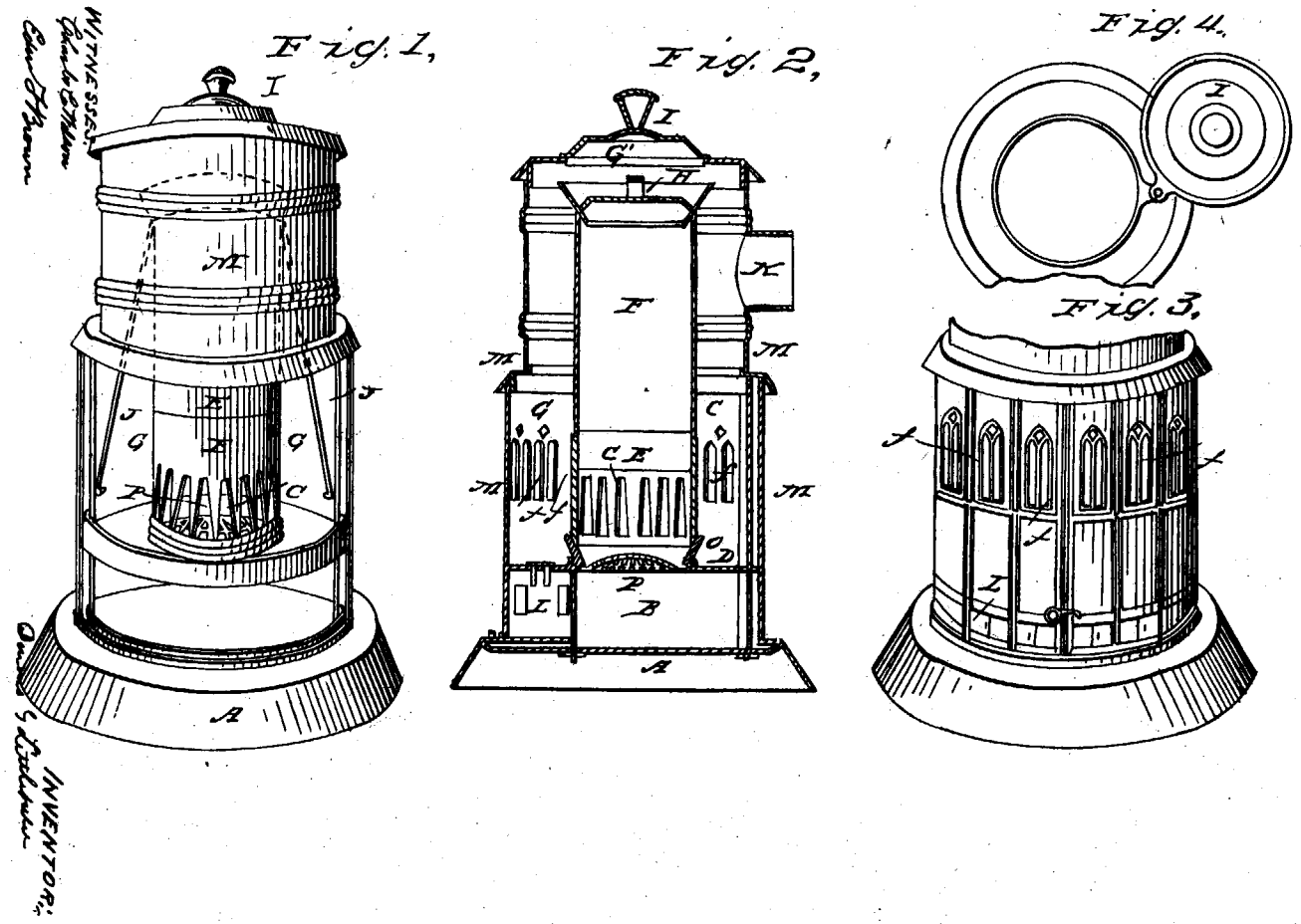
N. PETERS, Photo-Lithographer, Washington, D. C.

UNITED STATES PATENT OFFICE.

DENNIS G. LITTLEFIELD, OF ALBANY, NEW YORK.

IMPROVEMENT IN STOVES.

Specification forming part of Letters Patent No. 10,448, dated January 24, 1854; Reissue No. 1,237, dated November 19, 1861; Reissue No. 1,333, dated August 26, 1862; Reissue No. 1,478, dated May 19, 1863; Reissue No. 1,815, dated November 8, 1864.

DIVISION No. 3.

*To all whom it may concern:*

Be it known that I, DENNIS G. LITTLEFIELD, of Albany, in the county of Albany and State of New York, have invented new and useful Improvements in Stoves for Burning Anthracite and other Concentrated Fuels; and I do hereby declare the following to be a full, clear, and exact description of my invention, when taken in connection with the accompanying drawings and the letters of reference marked thereon, and which said drawings constitute part of this specification, and represent, in—

Figure 1, a perspective view of a cylindrical stove, a section of the outside casing removed to show the fire-pot; Fig. 2, a vertical central section of Fig. 1, showing the combination and arrangement of the various parts and their connection and adaptation to each other as here organized; Fig. 3, an illuminating-case, showing the arrangement thereof when combined with a stove in which a portion of its surface would be concealed by being placed against a wall or otherwise.

Similar letters indicate corresponding parts in the several figures.

My invention relates to an improvement in stoves which are supplied with an excess of fuel and the excess or reserve fuel fed to the fire as fast as consumption takes place, and for which I have applied for Letters Patent in even date herewith; and it consists in the peculiar construction of the fire-pot, whereby the point of active combustion is drawn toward the lower part of the fire.

In describing my improvement I show it as applied to the stove described in the application above referred to.

A is the base, B the ash-pit, P the fire-grate, O the lower part of the fire-pot, E the fire-pot, F the supplying-cylinder, M M the outer case of the chamber G, H the cover-opening to the fuel-supplying cylinder, which cover-opening is to be inclosed by the chamber G″, which communicates directly with the chamber G, and also with the smoke-flue K, so that no atmospheric air can by any possibility pass in at the top of the supplying-cylinder when the stove is in operation; I the cover to the chamber G″; L, the air-supplying register.

The fire-pot, which forms the subject of this application, is constructed with openings C (more or less in number) around its entire circumference, about one-half its diameter in height, and extending from as near the part O as practicable upward and made narrower at the top than at the bottom. As the draft will be strongest through the broader part of the opening the effect of this form is to draw the point of active combustion lower down and cause the hottest part of the fire to be at the base of the incandescent fuel, whereas, were the openings shorter or higher up, or of an equal width, the tendency would be to force active combustion higher up, and consequently consume fuel proportionally faster.

The form of the outlet from the fire-pot, though not absolutely essential, is important, as it adds to the successful operation of the stove, inasmuch as the highly-heated products of combustion are thereby brought lower than would be the case were the outlet-apertures of an equal width or widest at the top, as before described. The aggregate outlet-space from the fire-pot to the chamber receiving the gaseous products of combustion should be sufficiently large to allow such free passage therefrom to said chamber as will avoid any tendency of a passage upward through the reserve fuel, and to insure such proper working of the fire-pot or place where the fuel is consumed. The aggregate amount of outlet-space from the fire-pot to the chamber receiving the gaseous products of combustion therefrom should be greater than the aggregate amount of opening for the passage of air through the fire-grate or to the incandescent fuel.

Having, therefore, fully described my invention, what I claim as new and useful is—

1. A fire-pot constructed substantially as described, in combination with a fuel-supplying cylinder having its cover-opening surrounded by a chamber which communicates with the outlet from the fire-pot, and also with the flue leading to the chimney, when the openings in the fire-pot, or outlets therefrom, are broadest at the bottom, as and for the purpose specified.

2. The combination of a fire-pot constructed substantially as described with a fuel-supplying cylinder which has its cover-opening surrounded by a chamber which communicates with the outlet from the fire-pot, and also with the flue leading to the chimney, when the aggregate amount of outlet-space from the fire-pot exceeds the amount of inlet, as and for the purpose specified.

DENNIS G. LITTLEFIELD.

Witnesses:

CHARLES C. WILSON,
EDM. F. BROWN.